(12) United States Patent
Feng (10) Patent No.: US 11,100,818 B1
(45) Date of Patent: Aug. 24, 2021

(54) FLEXIBLE DISPLAY DEVICE AND DISPLAY APPARATUS

(71) Applicant: WUHAN CHINA STAR OPTOELECTRONICS SEMICONDUCTOR DISPLAY TECHNOLOGY CO., LTD., Hubei (CN)

(72) Inventor: Zikang Feng, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 152 days.

(21) Appl. No.: 16/621,972

(22) PCT Filed: May 24, 2019

(86) PCT No.: PCT/CN2019/088275
§ 371 (c)(1),
(2) Date: Dec. 12, 2019

(87) PCT Pub. No.: WO2020/215428
PCT Pub. Date: Oct. 29, 2020

(30) Foreign Application Priority Data

Apr. 25, 2019 (CN) .......................... 201910338298.X (51) Int. Cl.
*G09F 9/30* (2006.01)
*G06F 1/16* (2006.01)

(52) U.S. Cl.
CPC ............ *G09F 9/301* (2013.01); *G06F 1/1652* (2013.01); *G06F 1/1656* (2013.01)

(58) Field of Classification Search
CPC combination set(s) only.
See application file for complete search history.

(56) References Cited

U.S. PATENT DOCUMENTS

| | | | |
|---|---|---|---|
| 8,727,601 B2 * | 5/2014 | Wang ................... | G06F 1/1681 362/632 |
| 9,229,481 B2 * | 1/2016 | Jinbo ................... | H01L 27/323 |
| 9,235,239 B2 * | 1/2016 | van Dijk .............. | G06F 1/1681 |
| 9,557,771 B2 * | 1/2017 | Park ..................... | G06F 1/1681 |
| 9,651,998 B2 * | 5/2017 | Matsueda ........... | H04M 1/0216 |
| 9,905,795 B2 * | 2/2018 | Matsueda ........... | H04M 1/0268 |
| 9,952,626 B2 * | 4/2018 | Jinbo ................... | G06F 1/1601 |
| 10,306,788 B2 * | 5/2019 | Bi ........................ | E05D 3/06 |
| 10,356,922 B2 * | 7/2019 | Chen ................... | H05K 5/0017 |

(Continued)

*Primary Examiner* — Lisa Lea-Edmonds (57) ABSTRACT

A flexible display device and a display apparatus are provided, which include: a first sub-housing and a second sub-housing, the first sub-housing is relatively away from the second sub-housing to adjust the housing to be in an open state, and an opening is formed between the first sub-housing and the second sub-housing. A flexible display panel disposed on a first surface of the housing, and the flexible display panel is spread on a surface of the housing when the housing is in the open state. A support structure includes a support plate, the support plate is received in the housing when the first sub-housing is relatively close to the second sub-housing, and when the housing is in the open state, the support plate abuts against the flexible display panel.

20 Claims, 3 Drawing Sheets

(56) References Cited

U.S. PATENT DOCUMENTS

| | | | |
|---|---|---|---|
| 10,551,880 B1 * | 2/2020 | Ai | H04M 1/0216 |
| 10,694,624 B2 * | 6/2020 | Rothkopf | G06F 1/1652 |
| 11,048,305 * | 6/2021 | Ye | H04M 1/0268 |
| 2014/0328041 A1 * | 11/2014 | Rothkopf | H04M 1/0216 361/807 |
| 2021/0076517 A1 * | 3/2021 | Wang | H04M 1/0268 |
| 2021/0191468 A1 * | 6/2021 | Nakamura | G02B 1/14 |

* cited by examiner

FLEXIBLE DISPLAY DEVICE AND DISPLAY APPARATUS

CROSS-REFERENCE TO RELATED APPLICATIONS

This application is a National Phase entry of International Application No. PCT/CN2019/088275, filed on May 24, 2019, which claims priority to Chinese Application Nos. 201910338298.X filed on Apr. 25, 2019, both of which are incorporated by reference herein.

FIELD OF INVENTION

The present application relates to a field of display technologies, and in particular, to a flexible display device and a display apparatus.

BACKGROUND OF INVENTION

In recent years, organic light emitting diodes (OLEDs) have attracted wide attention due to their bendability and flexibility. By folding or rolling up OLEDs, the space occupied by larger screens can be reduced, making them more portable. Therefore, foldable and rollable display apparatus are the main research directions of flexible OLEDs.

In the current art, since a shape of the housing is changed when the foldable and the rollable display apparatus are folded or curled, a part of the flexible display panel cannot be supported by the housing, and when the user clicks on the flexible display panel, there is a feeling of depression.

Therefore, the current art has drawbacks and a need for improvement is in urgent.

Technical Problem

The embodiment of the present application provides a flexible display device and a display apparatus so that a part of flexible display panel without supported by the housing is not existed when the display apparatus is folded or curled, thereby avoiding the feeling of depression.

SUMMARY OF INVENTION

Technical Solution

In a first aspect, an embodiment of the present application provides a flexible display device, including: a housing including a first sub-housing and a second sub-housing, the first sub-housing being relatively close to or away from the second sub-housing, wherein the first sub-housing is relatively away from the second sub-housing to adjust the housing to be in an open state, an opening is formed between the first sub-housing and the second sub-housing, and a slit is disposed on at least one of the first sub-housing and the second sub-housing; a flexible display panel disposed on a first surface of the housing, wherein when the first sub-housing is relatively close to the second sub-housing, at least an end of the flexible display panel extends into the slit and curls inside the housing, and the flexible display panel is spread on a surface of the housing when the housing is in the open state; a support structure fixedly disposed inside the housing, wherein the support structure includes a support plate, the support plate is received in the housing when the first sub-housing is relatively close to the second sub-housing, and when the housing is in the open state, the support plate moves to the opening and abuts against the flexible display panel.

In a flexible display device according to the present application, a side wall of the first sub-housing is provided with a first slide, a side wall of the second sub-housing is provided with a second slide, an end of the support plate is provided with a first slider and another end of the support plate is provided with a second slider, the first slider slides along the first slide, and the second slider slides along the second slide to drive the support plate to move.

In a flexible display device according to the present application, a first slide has a first end and a second end, the first end is away from the second sub-housing and the second end is close to the second sub-housing, a distance between the first end and the first surface is greater than a distance between the second end and the first surface, and the second slide has a third end and a fourth end, the third end is away from the first sub-housing and the fourth end is close to the first sub-housing, a distance between the third end and the first surface is greater than a distance between the fourth end and the first surface.

In a flexible display device according to the present application, a first sub-housing is relatively close to the second sub-housing to drive the first slider to slide in a direction from the second end of the first slide toward the first end thereof, the second slider slides in a direction from the fourth end of the second slide toward the third end thereof, and the support plate moves in a direction away from the first surface, and the first sub-housing and the second sub-housing are relatively far apart to drive the first slider to slide in a direction from the first end of the first slide toward the second end thereof, the second slider slides in a direction from the third end of the second slide toward the fourth end thereof, and the support plate moves in a direction close to the first surface.

In a flexible display device according to the present application, when the housing is in the open state, the first slider is positioned at the second end of the first slide, and the second slider is positioned at the fourth end of the second slide.

In a flexible display device according to the present application, an end of the first sub-housing away from an end of the second sub-housing is provided with a first slit, an end of the second sub-housing away from the end of the first sub-housing is provided with a second slit, when the first sub-housing is relatively close to the second sub-housing, the first end of the flexible display panel extends into the first slit and curls inside the first sub-housing, and the second end of the flexible display panel extends into the second slit and curls inside the second sub-housing.

In a flexible display device according to the present application, a support structure further includes a backplane fixed inside the housing and a telescopic part connected between the backplane and the support plate.

In a flexible display device according to the present application, when the first sub-housing is relatively close to the second sub-housing, the telescopic part is in a shrinkage state to control the support plate to be received in the housing, when the housing is in the open state, the telescopic part is in a stretch state to control the support plate to move to the opening and to abut against the flexible display panel.

In a flexible display device according to the present application, a telescopic part includes a first fixed part and a second fixed part, the first fixed part is fixedly connected to a side of the backplane facing the support plate, the first fixed part has a groove, the second fixed part is fixed to a side of the support plate facing the backplane, and the second fixed part extends into the groove of the first fixed part and slides along the groove.

In a flexible display device according to the present application, a support structure further includes: a backplane fixed inside the housing, wherein the backplane is further provided with a plurality of guide holes, the support plate is disposed on the backplane, and the support plate corresponding to the guide holes is provided with a plurality of guide pillars, wherein each of the guide pillars is embedded in each of the guide holes.

In a second aspect, an embodiment of the present application further provides a display apparatus, which the display apparatus includes a flexible display device. The flexible display device including a housing including a first sub-housing and a second sub-housing, the first sub-housing being relatively close to or away from the second sub-housing. The first sub-housing is relatively away from the second sub-housing to adjust the housing to be in an open state, an opening is formed between the first sub-housing and the second sub-housing, and a slit is disposed on at least one of the first sub-housing and the second sub-housing. A flexible display panel disposed on a first surface of the housing. When the first sub-housing is relatively close to the second sub-housing, at least an end of the flexible display panel extends into the slit and curls inside the housing, and the flexible display panel is spread on a surface of the housing when the housing is in the open state. A support structure is fixedly disposed inside the housing. The support structure includes a support plate, the support plate is received in the housing when the first sub-housing is relatively close to the second sub-housing, and when the housing is in the open state, the support plate moves to the opening and abuts against the flexible display panel.

In a flexible display apparatus according to the present application, a side wall of the first sub-housing is provided with a first slide, a side wall of the second sub-housing is provided with a second slide, an end of the support plate is provided with a first slider and another end of the support plate is provided with a second slider, the first slider slides along the first slide, and the second slider slides along the second slide to drive the support plate to move.

In a flexible display apparatus according to the present application, a first slide has a first end and a second end, the first end is away from the second sub-housing and the second end is close to the second sub-housing, a distance between the first end and the first surface is greater than a distance between the second end and the first surface, and the second slide has a third end and a fourth end, the third end is away from the first sub-housing and the fourth end is close to the first sub-housing, a distance between the third end and the first surface is greater than a distance between the fourth end and the first surface.

In a flexible display apparatus according to the present application, a first sub-housing is relatively close to the second sub-housing to drive the first slider to slide in a direction from the second end of the first slide toward the first end thereof, the second slider slides in a direction from the fourth end of the second slide toward the third end thereof, and the support plate moves in a direction away from the first surface, and the first sub-housing and the second sub-housing are relatively far apart to drive the first slider to slide in a direction from the first end of the first slide toward the second end thereof, the second slider slides in a direction from the third end of the second slide toward the fourth end thereof, and the support plate moves in a direction close to the first surface.

In a flexible display apparatus according to the present application, when the housing is in the open state, the first slider is positioned at the second end of the first slide, and the second slider is positioned at the fourth end of the second slide.

In a flexible display apparatus according to the present application, an end of the first sub-housing away from an end of the second sub-housing is provided with a first slit, an end of the second sub-housing away from the end of the first sub-housing is provided with a second slit, when the first sub-housing is relatively close to the second sub-housing, the first end of the flexible display panel extends into the first slit and curls inside the first sub-housing, and the second end of the flexible display panel extends into the second slit and curls inside the second sub-housing.

In a flexible display apparatus according to the present application, a support structure further includes a backplane fixed inside the housing and a telescopic part connected between the backplane and the support plate.

In a flexible display apparatus according to the present application, when the first sub-housing is relatively close to the second sub-housing, the telescopic part is in a shrinkage state to control the support plate to be received in the housing, when the housing is in the open state, the telescopic part is in a stretch state to control the support plate to move to the opening and to abut against the flexible display panel.

In a flexible display apparatus according to the present application, a telescopic part includes a first fixed part and a second fixed part, the first fixed part is fixedly connected to a side of the backplane facing the support plate, the first fixed part has a groove, the second fixed part is fixed to a side of the support plate facing the backplane, and the second fixed part extends into the groove of the first fixed part and slides along the groove.

In a third aspect, an embodiment of the present application provides a flexible display device, including: a housing including a first sub-housing and a second sub-housing, the first sub-housing being relatively close to or away from the second sub-housing, wherein the first sub-housing is relatively away from the second sub-housing to adjust the housing to be an open state, an opening is formed between the first sub-housing and the second sub-housing, and a slit is disposed on at least one of the first sub-housing and the second sub-housing; a flexible display panel disposed on a first surface of the housing, wherein when the first sub-housing is relatively close to the second sub-housing, at least an end of the flexible display panel extends into the slit and curls inside the housing, and the flexible display panel is spread on a surface of the housing when the housing is in an open state, wherein at least an end of the flexible display panel is connected to a coil spring; and a support structure fixedly disposed inside the housing, wherein the support structure includes a support plate, the support plate is received in the housing when the first sub-housing is relatively close to the second sub-housing, and when the housing is in the open state, the support plate moves to the opening and abuts against the flexible display panel.

Beneficial Effect

The flexible display device provided by the embodiment of the present application includes: a housing including a first sub-housing and a second sub-housing, the first sub-housing being relatively close to or away from the second sub-housing, wherein the first sub-housing is relatively away from the second sub-housing to adjust the housing to be an open state, an opening is formed between the first sub-housing and the second sub-housing, and a slit is disposed on at least one of the first sub-housing and the second sub-housing; a flexible display panel disposed on a first surface of the housing, wherein when the first sub-housing is relatively close to the second sub-housing, at least an end of the flexible display panel extends into the slit and curls inside the housing, and the flexible display panel is spread on a surface of the housing when the housing is in an open state; and a support structure fixedly disposed inside the housing, wherein the support structure includes a support plate, the support plate is received in the housing when the first sub-housing is relatively close to the second sub-housing, and when the housing is in the open state, the support plate moves to the opening and abuts against the flexible display panel. So that a part of a flexible display panel without supported by the housing is not existed when the display apparatus is folded or curled, thereby avoiding the feeling of depression.

BRIEF DESCRIPTION OF FIGURES

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION OF EMBODIMENTS

The technical solutions in the embodiments of the present application will be clearly and completely described in the following with reference to the accompanying drawings in the embodiments. Apparently, the described embodiments are merely a part of the embodiments of the present application and not all of them. All other embodiments obtained by a person skilled in the art based on the embodiments of the present application without creative efforts are within the scope of the present application.

In the current art, flexible screens have wide applications for future personal smart terminals due to their low power consumption and flexible characteristics. However, for the existing device with a flexible screen, operability range and visual performance of the screen are increased in the future, and size of the flexible screen is often too large. The flexible screen itself has a bendable characteristic, and generally, the flexible screen is curled into a housing when no operation is required, and the flexible screen is unfolded when the screen needs to be operated. However, since the flexible screen itself is a soft material and a bottom support is weak, when the user operates the flexible screen, an operation region is easily recessed. It has a feeling of depression and is not easy to operate.

An embodiment of the present application provides a flexible display device, including: a housing including a first sub-housing and a second sub-housing, the first sub-housing being relatively close to or away from the second sub-housing, wherein the first sub-housing is relatively away from the second sub-housing to adjust the housing to be an open state, an opening is formed between the first sub-housing and the second sub-housing, and a slit is disposed on at least one of the first sub-housing and the second sub-housing; a flexible display panel disposed on a first surface of the housing, wherein when the first sub-housing is relatively close to the second sub-housing, at least an end of the flexible display panel extends into the slit and curls inside the housing, and the flexible display panel is spread on a surface of the housing when the housing is in an open state, wherein at least an end of the flexible display panel is connected to a coil spring; and a support structure fixedly disposed inside the housing, wherein the support structure includes a support plate, the support plate is received in the housing when the first sub-housing is relatively close to the second sub-housing, and when the housing is in the open state, the support plate moves to the opening and abuts against the flexible display panel.

Figure 1:
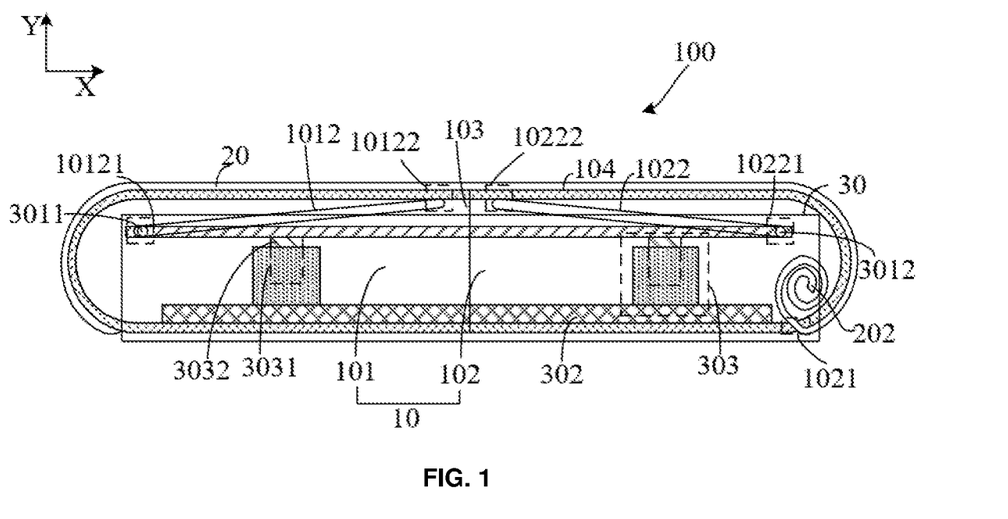
FIG. 1 is a schematic diagram of a first structure of a flexible display device according to an embodiment of the present disclosure.
Figure 2:
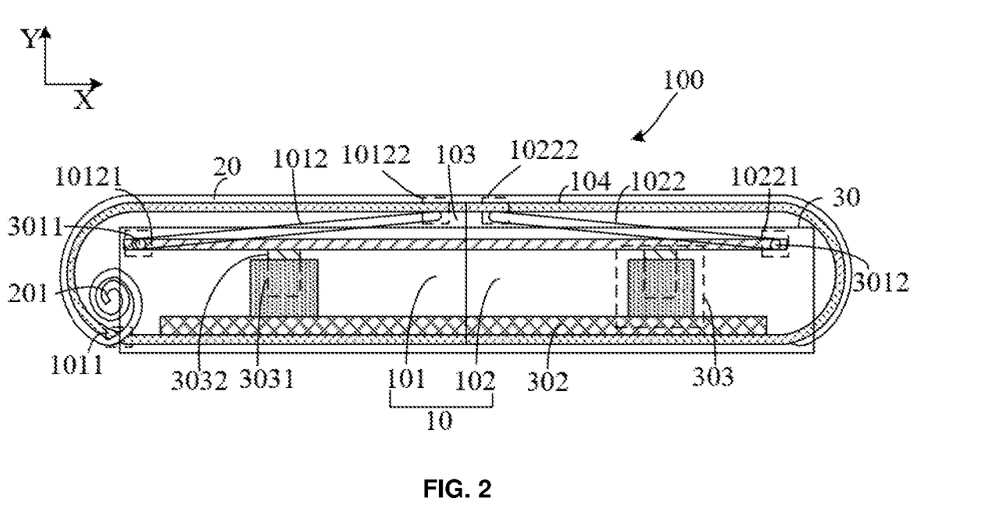
FIG. 2 is a schematic diagram of a second structure of a flexible display device according to an embodiment of the present application.
Figure 3:
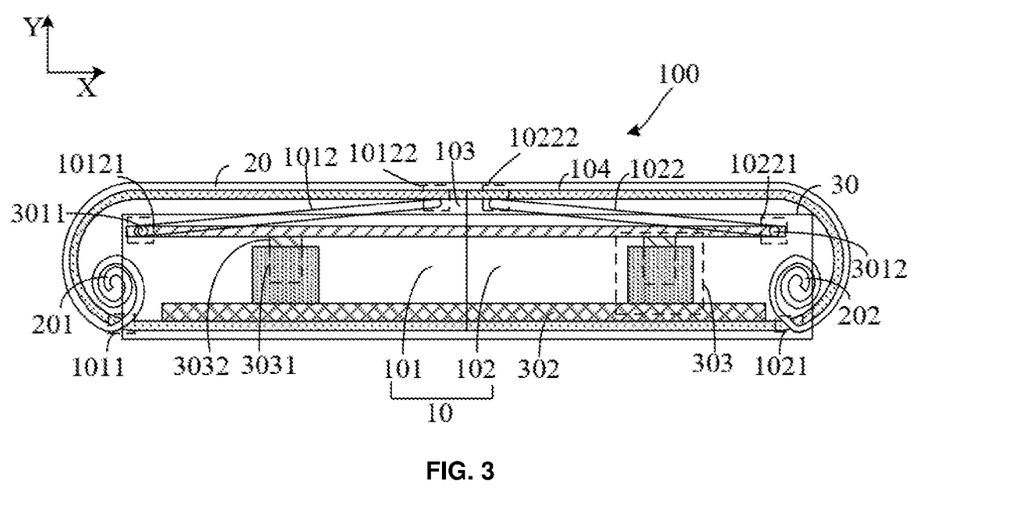
FIG. 3 is a schematic diagram of a third structure in a flexible display device according to an embodiment of the present disclosure.

Referring to FIG. 1, FIG. 2, and FIG. 3. FIG. 1 is a schematic diagram of a first structure of a flexible display device 100 according to an embodiment of the present application, FIG. 2 is a schematic diagram of a second structure of a flexible display device 100 according to an embodiment of the present application, and FIG. 3 is a schematic diagram of a third structure of a flexible display device 100 according to an embodiment of the present application. The flexible display device 100 includes the following.

A housing 10 includes a first sub-housing 101 and a second sub-housing 102, the first sub-housing 101 being relatively close to or away from the second sub-housing 102. The first sub-housing 101 is relatively away from the second sub-housing 102 to adjust the housing 10 to be in an open state. An opening 103 is formed between the first sub-housing 101 and the second sub-housing 102, and a slit is disposed on at least one of the first sub-housing 101 and the second sub-housing 102.

A flexible display panel 20 is disposed on a first surface 104 of the housing 10, when the first sub-housing 101 is relatively close to the second sub-housing 102, at least an end of the flexible display panel 20 extends into the slit and curls inside the housing 10, and the flexible display panel 20 is spread on a surface of the housing 10 when the housing is in the open state.

A support structure 30 is fixedly disposed inside the housing 10, the support structure 30 includes a support plate 301, the support plate 301 is received in the housing 10 when the first sub-housing 101 is relatively close to the second sub-housing 102, and when the housing 10 is in the open state, the support plate 301 moves to the opening 103 and abuts against the flexible display panel.

Specifically, FIG. 1 is a schematic structural diagram showing the first sub-housing 101 being relatively close to the second sub-housing 102 in the housing 10 of the flexible display device 100 of the present application. When the first sub-housing 101 relatively closes to the second sub-housing 102, it can be understood that the first sub-housing 101 moves in an X direction, and the second sub-housing 102 moves in an X negative direction until the first sub-housing 101 and the second sub-housing 102 cannot be further in a relatively close state.

At this time, it can be seen that the flexible display panel 20 disposed on the first surface 104 of the housing 10 having a first end 201 curled inside the first sub-housing 101, and a second end 202 of the flexible display panel 20 is curled inside the second sub-housing 102. Furthermore, in order to make the first end 201 and the second end 202 of the flexible display panel 20 be curled, at least an end of the flexible display panel 20 is connected to a coil spring, that is, the first end 201 and/or the second end 202 is connected to the coil spring to achieve a curled setting. When the first sub-housing 101 is relatively close to the second sub-housing 102, the flexible display panel 20 can also be changed from a spread state to a curled state. A first slit 1011 is disposed at an end of the first sub-housing 101 away from the second sub-housing 102, and a second slit 1021 is disposed at an end of the second sub-housing 102 away from the first sub-housing 101. The first end 201 of the flexible display panel 20 is passed through the first slit 1011 into an interior of the first sub-housing 101, and the second end 202 passes through the second slit 2021 into an interior of the second sub-housing 102.

Figure 4:
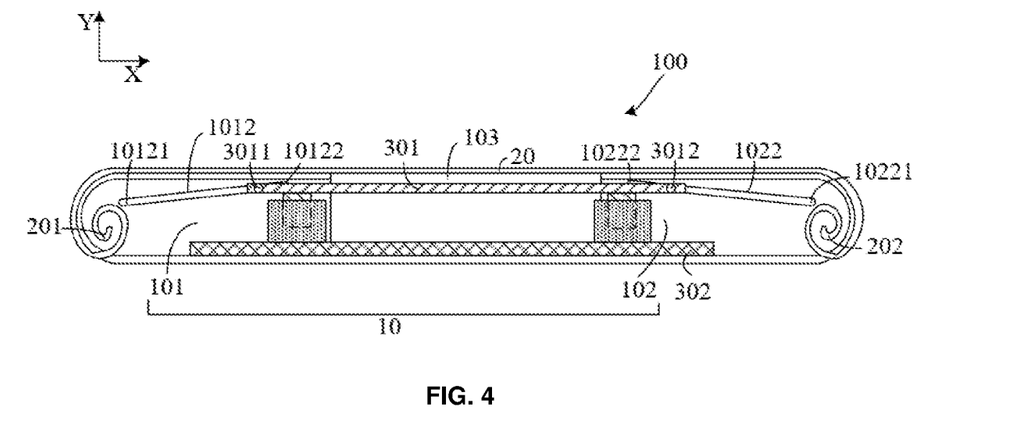
FIG. 4 is a schematic diagram of a fourth structure of a flexible display device according to an embodiment of the present disclosure.

Referring to FIG. 4, FIG. 4 is a schematic diagram of a fourth structure of the flexible display device 100 in the present application, that is, an intermediate diagram in which the first sub-housing 101 and the second sub-housing 102 are separated from each other.

It can be seen that since the first sub-housing 101 and the second sub-housing 102 are relatively far away, an opening 103 is formed between the first sub-housing 101 and the second sub-housing 102. At this time, the flexible display panel 20 on the first surface 104 is extracted the first end 201 of the flexible display panel 20 curled inside the first sub-housing 101 from the first slit 1011 due to the generating of the opening 103, and also the second end 202 of the flexible display panel 20 curled inside the second sub-housing 102 is extracted from the second slit 1021. Therefore, to solve the problem that a length of the flexible display panel 20 is insufficient due to a length of the flexible display device 100 becoming longer in the X direction.

Further, since a part of the flexible display panel 20 is on the opening 103 in the open state, a support structure 30 is further fixedly disposed inside the housing 10, and the support structure 30 has a support plate 301. The support plate 301 is received in the housing 10 when the first sub-housing 101 is relatively close to the second sub-housing 102. When the housing 10 is in the open state, the support plate 301 moves to the opening 103 and abuts against the flexible display panel 20, thereby solving the problem that a part of the flexible display panel 10 without supported under the housing 20 is in the open state.

The flexible display device provided by an embodiment of the present application includes a housing 10 including a first sub-housing 101 and a second sub-housing 102, the first sub-housing 101 being relatively close to or away from the second sub-housing 102. The first sub-housing 101 is relatively away from the second sub-housing 102 to adjust the housing to be in an open state. An opening 103 is formed between the first sub-housing and the second sub-housing. A slit is disposed on at least one of the first sub-housing 101 and the second sub-housing 102. A flexible display panel 20 is disposed on a first surface 104 of the housing 10. When the first sub-housing 101 is relatively close to the second sub-housing 102, at least an end of the flexible display panel 20 extends into the slit and curls inside the housing 10, and the flexible display panel 20 is spread on a surface of the housing 10 when the housing is in the open state. A support structure 30 is fixedly disposed inside the housing 10, and the support structure 30 includes a support plate 301. The support plate 301 is received in the housing 10 when the first sub-housing 101 is relatively close to the second sub-housing 102, and when the housing 10 is in the open state, the support plate 301 moves to the opening 103 and abuts against the flexible display panel 20. So that a part of a flexible display panel without supported by the housing is not existed when the display apparatus is folded or curled, thereby avoiding the feeling of depression.

Specifically, as shown in FIG. 3, an end of the first sub-housing 101 away from an end of the second sub-housing 102 is provided with a first slit 1011, an end of the second sub-housing 102 away from the end of the first sub-housing 102 is provided with a second slit 1021. When the first sub-housing 101 is relatively close to the second sub-housing 102, the first end 201 of the flexible display panel 20 extends into the first slit 1011 and curls inside the first sub-housing 101, and the second end 201 of the flexible display panel 20 extends into the second slit 1021 and curls inside the second sub-housing 102.

It can be understood that comparing FIG. 1 and FIG. 2, the slit is disposed only on the second sub-housing 102 in FIG. 1, to make the flexible display panel 20 is curled inside the second sub-housing 102 through the slit, and the slit is disposed only on the first sub-housing 101 in FIG. 2, to make the flexible display panel 20 is curled inside the first sub-housing 101 through the slit. However, both sides of the first sub-housing 101 and the second sub-housing 102 are disposed with the slit in FIG. 3, to make the first end 201 of the flexible display panel 20 extends into the first slit 1011 and curls inside the first sub-housing 101, and the second end 202 of the flexible display panel 20 extends into the second slit 1021 and curls inside the second sub-housing 102.

Figure 5:
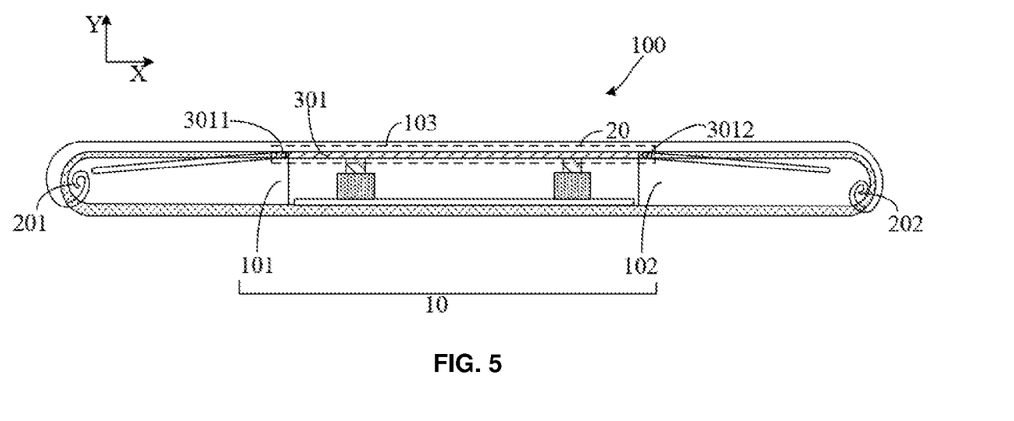
FIG. 5 is a schematic diagram of a fifth structure of a flexible display device according to an embodiment of the present disclosure.

Specifically, a side wall of the first sub-housing 101 is provided with a first slide 1012, a side wall of the second sub-housing 102 is provided with a second slide 1022, an end of the support plate 301 is provided with a first slider 3011 and another end of the support plate 301 is provided with a second slider 3012, the first slider 3011 slides along the first slide 1012, and the second slider 3012 slides along the second slide 1022 to drive the support plate 301 to move.

It can be understood that, referring to FIG. 5, FIG. 5 is a schematic diagram of a fifth structure of the flexible display device 100 according to an embodiment of the present disclosure. In this state, the housing 10 is in an open state, in order to reach that the support plate 301 can be moved up and down in a Y direction when the first sub-housing 101 is relatively close to or relatively away from the second sub-housing 102 in the X direction. Therefore, the first slide 1012 is disposed on the side wall of the first sub-housing 101, and the second slide 1022 is disposed on the side wall of the second sub-housing 102, and a first slider 3011 and a second slider 3012 are oppositely disposed on the side of the support plate 301 correspondingly. To make the first slider 3011 slides on the first slide 1012 and the second slider 3012 slides on the second slide 1022, thereby driving the movement of the support plate 301.

Specifically, the first slide 1012 has a first end 10121 and a second end 10122, the first end 10121 is away from the second sub-housing 102 and the second end 10122 is close to the second sub-housing 102. A distance between the first end 10121 and the first surface 104 is greater than a distance between the second end 10122 and the first surface 104, and the second slide 1022 has a third end 10221 and a fourth end 10222, the third end 10221 is away from the first sub-housing 101 and the fourth end 10222 is close to the first sub-housing 101, a distance between the third end 10221 and the first surface 104 is greater than a distance between the fourth end 10222 and the first surface 104.

It can be understood that in order to achieve the movement of the support plate 301 in the Y direction, it is necessary to define the distance between the end of the slide and the first surface 104. Taking the first slide 1012 as an example, since the distance from the first end 10121 of the first slide 1012 to the first surface 104 is greater than the distance from the second end 10122 to the first surface 104, therefore, when the housing 10 is from the closed to the open state or from the open to the closed state, the first slider 3011 slides on the first slide 1012 to drive the movement of the support plate 301 in the Y direction.

Specifically, the first sub-housing 101 is relatively close to the second sub-housing 102 to drive the first slider 3011 to slide in a direction from the second end 10122 of the first slide 1012 toward the first end 10121 thereof, the second slider 3012 slides in a direction from the fourth end 10222 of the second slide 1022 toward the third end 10221 thereof, and the support plate 301 moves in a direction away from the first surface 104, and the first sub-housing 101 and the second sub-housing 102 are relatively far apart to drive the first slider 3011 to slide in a direction from the first end 10121 of the first slide 1012 toward the second end 10122 thereof, the second slider 3012 slides in a direction from the third end 10221 of the second slide 1022 toward the fourth end 10222 thereof, and the support plate 301 moves in a direction close to the first surface 104.

It can be understood that the manner specifically described herein, in which when the first sub-housing 101 and the second sub-housing 102 are relatively close to each other or relatively far away, the first slider 3011 and the second slider 3012 move on the first slide 1012 and the second slide 1022 respectively, and movement of the first slider 3011 and the second slider 3012 drive the support plate 301 moving in a direction toward or away from the first surface 104.

Specifically, when the housing 10 is in an open state, the first slider 3011 is positioned at the second end 10122 of the first slide 1012, and the second slider 3012 is positioned at the fourth end 10222 of the second slide 1022.

It can be understood that in order to define the initial positions of the first slider 3011 and the second slider 3012 so that the first slider 3011 and the second slider 3012 can slide on the first slide 3011 and the second slide 1022 respectively when a state of the housing 10 is changed from the closed state to the open state or from the open state to the closed state. Thus, the support plate 301 closing to the first surface 104 is defined to be along the Y direction from the closed state to the open state, and away from the first surface 104 along a Y negative direction from the open state to the closed state.

Specifically, the support structure 30 further includes: a backplane 302 fixed inside the housing 10, and a telescopic part 303 connected between the backplane 302 and the support plate 301.

It can be understood that in order to avoid one end of the support plate 301 being too high and the other end of the support plate 301 being too low when the first sub-housing 101 and the second sub-housing 102 move too fast in the X direction. The telescopic part 303 is disposed under the support plate 301 so that the support plate 301 can only move in the Y direction. One end of the telescopic part 303 is connected to the backplane fixed in the housing 10 to ensure overall stability.

Specifically, when the first sub-housing 101 is relatively close to the second sub-housing 102, the telescopic part 303 is in a shrinkage state to control the support plate 301 to be received in the housing 10, when the housing 10 is in the open state, the telescopic part 303 is in a stretch state to control the support plate 301 to move to the opening 103 and to abut against the flexible display panel 20.

The telescopic part 303 here has functions of shrinkage and stretch, which can extend the housing 10 from the closed to the open state to achieve a function of resisting the support plate 301 and moving it to the first surface 104. The housing 10 is contracted from the open to the closed state to achieve a function of accommodating the support plate 301 inside the housing 10.

Specifically, the telescopic part 303 includes a first fixed part 3031 and a second fixed part 3032, the first fixed part 3031 is fixedly connected to a side of the backplane 302 facing the support plate 301, the first fixed part 3031 has a groove, the second fixed part 3032 is fixed to a side of the support plate 301 facing the backplane 302, and the second fixed part 3032 extends into the groove of the first fixed part and slides along the groove. It can be understood that the operation principle of the telescopic part 303 is specifically explained herein.

Figure 6:
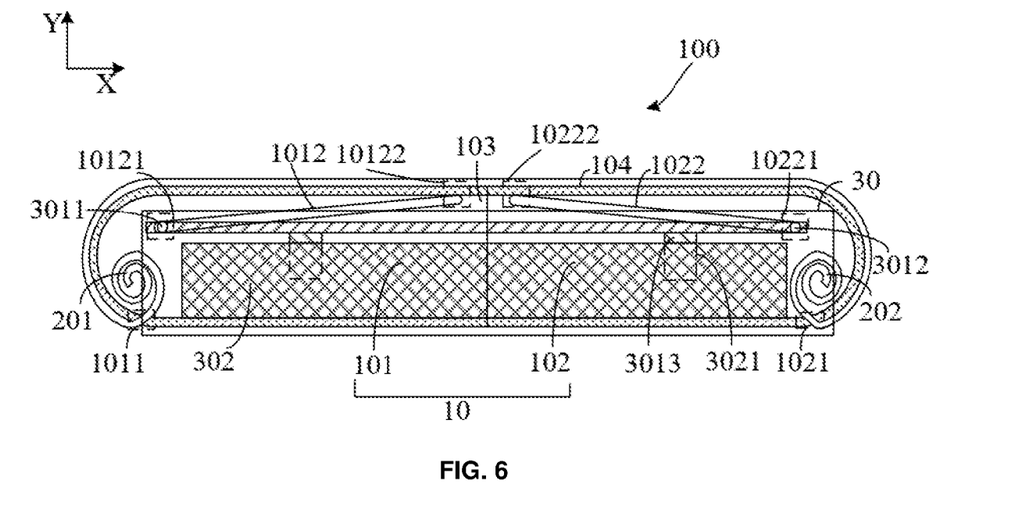
FIG. 6 is a sixth structural diagram of a flexible display device according to an embodiment of the present disclosure.

In another embodiment, as shown in FIG. 6, FIG. 6 is a schematic diagram of a sixth structure of a flexible display device 100 according to an embodiment of the present disclosure. The support structure 30 further includes a backplane 302 fixed inside the housing 10. The backplane 302 is further provided with a plurality of guide holes 3021, the support plate 301 is disposed on the backplane 302, and the support plate 301 corresponding to the guide holes 3021 is provided with a plurality of guide pillars 3013. Each of the guide pillars is embedded in each of the guide holes 3021.

Specifically, the guide hole 3021 can be directly formed on the backplane 302. The guide hole 3021 can be a through hole or an over hole, which is not limited thereto. A guide pillar 3013 is disposed on a side of the support plate 301 facing the backplane 302, and the guide pillar 3013 is disposed relative to the guide hole 3021, so that movement of the support plate 301 in the Y direction can also be achieved. A cross-sectional shape of the guide pillar 3013 can be the same as that of the guide hole 3021 and is circular, square, diamond-shaped, and the like, which will not be described herein.

The flexible display device provided by an embodiment of the present application includes a housing 10 including a first sub-housing 101 and a second sub-housing 102, the first sub-housing 101 being relatively close to or away from the second sub-housing 102. The first sub-housing 101 is relatively away from the second sub-housing 102 to adjust the housing to be in an open state. An opening 103 is formed between the first sub-housing and the second sub-housing. A slit is disposed on at least one of the first sub-housing 101 and the second sub-housing 102. A flexible display panel 20 is disposed on a first surface 104 of the housing 10. When the first sub-housing 101 is relatively close to the second sub-housing 102, at least an end of the flexible display panel 20 extends into the slit and curls inside the housing 10, and the flexible display panel 20 is spread on a surface of the housing 10 when the housing is in the open state. A support structure 30 is fixedly disposed inside the housing 10, and the support structure 30 includes a support plate 301. The support plate 301 is received in the housing 10 when the first sub-housing 101 is relatively close to the second sub-housing 102, and when the housing 10 is in the open state, the support plate 301 moves to the opening 103 and abuts against the flexible display panel 20. So that a part of a flexible display panel without supported by the housing is not existed when the display apparatus is folded or curled, thereby avoiding the feeling of depression. Moreover, through the first slider 3011 and the second slider 3012 disposed on the sides of the support plate 301 which are connected to the first slide 1012 and the second slide 1022 of the housing 10, the support structure 30 of the present application realizes the support plate 301 moving in the Y direction when the first sub-housing 101 and the second sub-housing 102 are moved in the X direction. Secondly, a tilting problem of the support plate 301 during the movement is prevented by the cooperation of the telescopic part 303 or the guide holes 3021 and pillars 3013.

An embodiment of the present application further provides a display apparatus, which the display apparatus includes a flexible display device.

The flexible display device including a housing including a first sub-housing and a second sub-housing, the first sub-housing being relatively close to or away from the second sub-housing. The first sub-housing is relatively away from the second sub-housing to adjust the housing to be in an open state, an opening is formed between the first sub-housing and the second sub-housing, and a slit is disposed on at least one of the first sub-housing and the second sub-housing.

A flexible display panel disposed on a first surface of the housing. When the first sub-housing is relatively close to the second sub-housing, at least an end of the flexible display panel extends into the slit and curls inside the housing, and the flexible display panel is spread on a surface of the housing when the housing is in the open state.

A support structure is fixedly disposed inside the housing. The support structure includes a support plate, the support plate is received in the housing when the first sub-housing is relatively close to the second sub-housing, and when the housing is in the open state, the support plate moves to the opening and abuts against the flexible display panel.

A side wall of the first sub-housing is provided with a first slide, a side wall of the second sub-housing is provided with a second slide, an end of the support plate is provided with a first slider and another end of the support plate is provided with a second slider, the first slider slides along the first slide, and the second slider slides along the second slide to drive the support plate to move.

The first slide has a first end and a second end, the first end is away from the second sub-housing and the second end is close to the second sub-housing. A distance between the first end and the first surface is greater than a distance between the second end and the first surface. The second slide has a third end and a fourth end, the third end is away from the first sub-housing and the fourth end is close to the first sub-housing. A distance between the third end and the first surface is greater than a distance between the fourth end and the first surface.

The first sub-housing is relatively close to the second sub-housing to drive the first slider to slide in a direction from the second end of the first slide toward the first end thereof, the second slider slides in a direction from the fourth end of the second slide toward the third end thereof, and the support plate moves in a direction away from the first surface. The first sub-housing and the second sub-housing are relatively far apart to drive the first slider to slide in a direction from the first end of the first slide toward the second end thereof, the second slider slides in a direction from the third end of the second slide toward the fourth end thereof, and the support plate moves in a direction close to the first surface.

When the housing is in the open state, the first slider is positioned at the second end of the first slide, and the second slider is positioned at the fourth end of the second slide.

An end of the first sub-housing away from an end of the second sub-housing is provided with a first slit. An end of the second sub-housing away from the end of the first sub-housing is provided with a second slit. When the first sub-housing is relatively close to the second sub-housing, the first end of the flexible display panel extends into the first slit and curls inside the first sub-housing, and the second end of the flexible display panel extends into the second slit and curls inside the second sub-housing.

The support structure further includes a backplane fixed inside the housing, and a telescopic part connected between the backplane and the support plate.

When the first sub-housing is relatively close to the second sub-housing, the telescopic part is in a shrinkage state to control the support plate to be received in the housing. When the housing is in the open state, the telescopic part is in a stretch state to control the support plate to move to the opening and to abut against the flexible display panel.

The telescopic part includes a first fixed part and a second fixed part, the first fixed part is fixedly connected to a side of the backplane facing the support plate, the first fixed part has a groove. The second fixed part is fixed to a side of the support plate facing the backplane, and the second fixed part extends into the groove of the first fixed part and slides along the groove.

The support structure further includes a backplane fixed inside the housing. The backplane is further provided with a plurality of guide holes. The support plate is disposed on the backplane, and the support plate corresponding to the guide holes is provided with a plurality of guide pillars, and each of the guide pillars is embedded in each of the guide holes.

Accordingly, the present application further provides a display device which includes the flexible display device 100 of any embodiment of the present application, the specific structure of the flexible display device 100 please refer to the preceding embodiments, and will not be described in detail herein.

The flexible display device and the display device provided by the embodiments of the present application are described in detail as above. The specific examples are used herein to explain the principles and implementations of the present application. For a person skilled in the art, any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:
1. A flexible display device, comprising:
a housing comprising a first sub-housing and a second sub-housing, the first sub-housing being relatively close to or away from the second sub-housing, wherein the first sub-housing is relatively away from the second sub-housing to adjust the housing to be in an open state, an opening is formed between the first sub-housing and the second sub-housing, and a slit is disposed on at least one of the first sub-housing and the second sub-housing;

a flexible display panel disposed on a first surface of the housing, wherein when the first sub-housing is relatively close to the second sub-housing, at least an end of the flexible display panel extends into the slit and curls inside the housing, and the flexible display panel is spread on a surface of the housing when the housing is in the open state;

a support structure fixedly disposed inside the housing, wherein the support structure comprises a support plate, the support plate is received in the housing when the first sub-housing is relatively close to the second sub-housing, and when the housing is in the open state, the support plate moves to the opening and abuts against the flexible display panel.

2. The flexible display device according to claim 1, wherein a side wall of the first sub-housing is provided with a first slide, a side wall of the second sub-housing is provided with a second slide, an end of the support plate is provided with a first slider and another end of the support plate is provided with a second slider, the first slider slides along the first slide, and the second slider slides along the second slide to drive the support plate to move.

3. The flexible display device according to claim 2, wherein the first slide has a first end and a second end, the first end is away from the second sub-housing and the second end is close to the second sub-housing, a distance between the first end and the first surface is greater than a distance between the second end and the first surface, and the second slide has a third end and a fourth end, the third end is away from the first sub-housing and the fourth end is close to the first sub-housing, a distance between the third end and the first surface is greater than a distance between the fourth end and the first surface.

4. The flexible display device according to claim 3, wherein the first sub-housing is relatively close to the second sub-housing to drive the first slider to slide in a direction from the second end of the first slide toward the first end thereof, the second slider slides in a direction from the fourth end of the second slide toward the third end thereof, and the support plate moves in a direction away from the first surface, and the first sub-housing and the second sub-housing are relatively far apart to drive the first slider to slide in a direction from the first end of the first slide toward the second end thereof, the second slider slides in a direction from the third end of the second slide toward the fourth end thereof, and the support plate moves in a direction close to the first surface.

5. The flexible display device according to claim 3, wherein when the housing is in the open state, the first slider is positioned at the second end of the first slide, and the second slider is positioned at the fourth end of the second slide.

6. The flexible display device according to claim 1, wherein an end of the first sub-housing away from an end of the second sub-housing is provided with a first slit, an end of the second sub-housing away from the end of the first sub-housing is provided with a second slit, when the first sub-housing is relatively close to the second sub-housing, the first end of the flexible display panel extends into the first slit and curls inside the first sub-housing, and the second end of the flexible display panel extends into the second slit and curls inside the second sub-housing.

7. The flexible display device according to claim 1, wherein the support structure further comprises:
a backplane fixed inside the housing, and
a telescopic part connected between the backplane and the support plate.

8. The flexible display device according to claim 7, wherein when the first sub-housing is relatively close to the second sub-housing, the telescopic part is in a shrinkage state to control the support plate to be received in the housing, when the housing is in the open state, the telescopic part is in a stretch state to control the support plate to move to the opening and to abut against the flexible display panel.

9. The flexible display device according to claim 7, wherein the telescopic part comprises a first fixed part and a second fixed part, the first fixed part is fixedly connected to a side of the backplane facing the support plate, the first fixed part has a groove, the second fixed part is fixed to a side of the support plate facing the backplane, and the second fixed part extends into the groove of the first fixed part and slides along the groove.

10. The flexible display device according to claim 1, wherein the support structure further comprises:
a backplane fixed inside the housing, wherein the backplane is further provided with a plurality of guide holes, the support plate is disposed on the backplane, and the support plate corresponding to the guide holes is provided with a plurality of guide pillars, wherein each of the guide pillars is embedded in each of the guide holes.

11. A display apparatus which includes a flexible display device, the flexible display device comprising:
a housing comprising a first sub-housing and a second sub-housing, the first sub-housing being relatively close to or away from the second sub-housing, wherein the first sub-housing is relatively away from the second sub-housing to adjust the housing to be in an open state, an opening is formed between the first sub-housing and the second sub-housing, and a slit is disposed on at least one of the first sub-housing and the second sub-housing;

a flexible display panel disposed on a first surface of the housing, wherein when the first sub-housing is relatively close to the second sub-housing, at least an end of the flexible display panel extends into the slit and curls inside the housing, and the flexible display panel is spread on a surface of the housing when the housing is in the open state;

a support structure fixedly disposed inside the housing, wherein the support structure comprises a support plate, the support plate is received in the housing when the first sub-housing is relatively close to the second sub-housing, and when the housing is in the open state, the support plate moves to the opening and abuts against the flexible display panel.

12. The display apparatus according to claim 11, wherein a side wall of the first sub-housing is provided with a first slide, a side wall of the second sub-housing is provided with a second slide, an end of the support plate is provided with a first slider and another end of the support plate is provided with a second slider, the first slider slides along the first slide, and the second slider slides along the second slide to drive the support plate to move.

13. The display apparatus according to claim 12, wherein the first slide has a first end and a second end, the first end is away from the second sub-housing and the second end is close to the second sub-housing, a distance between the first end and the first surface is greater than a distance between the second end and the first surface, and the second slide has a third end and a fourth end, the third end is away from the first sub-housing and the fourth end is close to the first sub-housing, a distance between the third end and the first surface is greater than a distance between the fourth end and the first surface.

14. The display apparatus according to claim 13, wherein the first sub-housing is relatively close to the second sub-housing to drive the first slider to slide in a direction from the second end of the first slide toward the first end thereof, the second slider slides in a direction from the fourth end of the second slide toward the third end thereof, and the support plate moves in a direction away from the first surface, and the first sub-housing and the second sub-housing are relatively far apart to drive the first slider to slide in a direction from the first end of the first slide toward the second end thereof, the second slider slides in a direction from the third end of the second slide toward the fourth end thereof, and the support plate moves in a direction close to the first surface.

15. The display apparatus according to claim 13, wherein when the housing is in the open state, the first slider is positioned at the second end of the first slide, and the second slider is positioned at the fourth end of the second slide.

16. The display apparatus according to claim 11, wherein an end of the first sub-housing away from an end of the second sub-housing is provided with a first slit, an end of the second sub-housing away from the end of the first sub-housing is provided with a second slit, when the first sub-housing is relatively close to the second sub-housing, the first end of the flexible display panel extends into the first slit and curls inside the first sub-housing, and the second end of the flexible display panel extends into the second slit and curls inside the second sub-housing.

17. The display apparatus according to claim 11, wherein the support structure further comprises:
a backplane fixed inside the housing, and
a telescopic part connected between the backplane and the support plate.

18. The display apparatus according to claim 17, wherein when the first sub-housing is relatively close to the second sub-housing, the telescopic part is in a shrinkage state to control the support plate to be received in the housing, when the housing is in the open state, the telescopic part is in a stretch state to control the support plate to move to the opening and to abut against the flexible display panel.

19. The display apparatus according to claim 17, wherein the telescopic part comprises a first fixed part and a second fixed part, the first fixed part is fixedly connected to a side of the backplane facing the support plate, the first fixed part has a groove, the second fixed part is fixed to a side of the support plate facing the backplane, and the second fixed part extends into the groove of the first fixed part and slides along the groove.

20. A flexible display device, comprising:
a housing comprising a first sub-housing and a second sub-housing, the first sub-housing being relatively close to or away from the second sub-housing, wherein the first sub-housing is relatively away from the second sub-housing to adjust the housing to be an open state, an opening is formed between the first sub-housing and the second sub-housing, and a slit is disposed on at least one of the first sub-housing and the second sub-housing;
a flexible display panel disposed on a first surface of the housing, wherein when the first sub-housing is relatively close to the second sub-housing, at least an end of the flexible display panel extends into the slit and curls inside the housing, and the flexible display panel is spread on a surface of the housing when the housing is in an open state, wherein at least an end of the flexible display panel is connected to a coil spring; and
a support structure fixedly disposed inside the housing, wherein the support structure comprises a support plate, the support plate is received in the housing when the first sub-housing is relatively close to the second sub-housing, and when the housing is in the open state, the support plate moves to the opening and abuts against the flexible display panel.

\* \* \* \* \*